Oct. 8, 1957             J. L. MORRIS            2,808,712
METHODS AND MEANS FOR CREATING PATTERNS
AND CONTROLLING KNITTING CHANGES.
Filed Jan. 28, 1955            9 Sheets-Sheet 1

INVENTOR.
JOSEPH L. MORRIS
BY
*Gottard Holochek*
ATTORNEY

United States Patent Office 2,808,712
Patented Oct. 8, 1957

2,808,712

METHODS AND MEANS FOR CREATING PATTERNS AND CONTROLLING KNITTING CHANGES

Joseph L. Morris, Elmhurst, N. Y.

Application January 28, 1955, Serial No. 484,624

3 Claims. (Cl. 66—50)

This invention relates to a device for knitting machines, so designed that patterns and knitting changes may both be made with the same device. The invention further relates to a method of creating patterns and controlling knitting changes.

At present knitting changes are made through a variety of extra devices and attachments, and it is one object of this invention to eliminate most of these.

Another object is to make it possible to knit on more feeds, and to produce larger Jacquard patterns, and have more knitting changes provided for, than is at present possible.

Another object is to permit more than one large Jacquard pattern to be set up at the same time, and to permit any pattern to be used when so desired by the knitter.

Another object is to permit one pattern to be made in the body of a garment, and an entirely different pattern to be produced in the cuff of the garment.

Another object is to permit irregular patterns to be started immediately upon the completion of one pattern, and repeated.

Another object is to provide a split pattern drum that may reciprocate vertically in both directions through a plurality of steps on multiple feed knitting machines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Figures 1, 3, 3A:
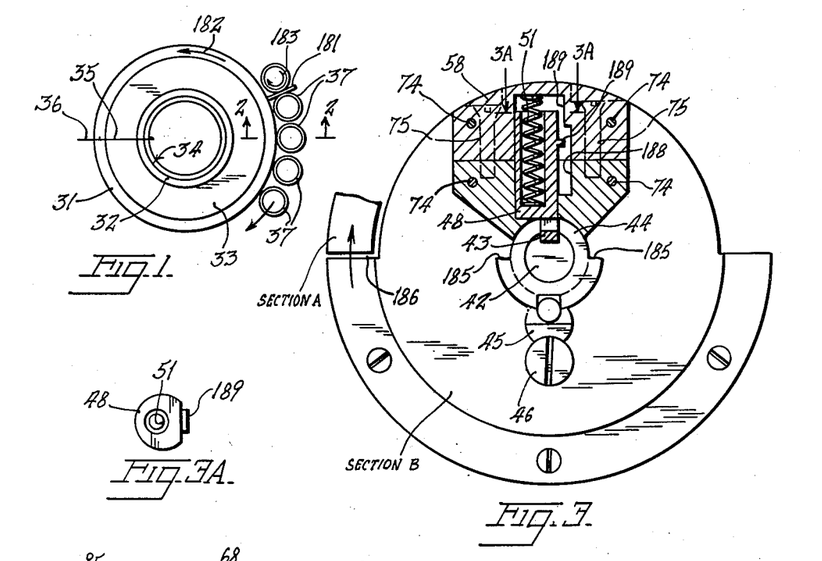
Fig. 1 is a somewhat diagrammatic top plan view of a jersey knitting machine with my invention applied, only a few of the pattern drums being shown.
Fig. 3 is a fragmentary sectional view substantially on line 3—3 of Fig. 2.
Fig. 3A is a detail section on line 3A—3A of Fig. 3.

Fig. 1 shows a generally conventional jersey knitting machine with my invention applied. The machine comprises two dials including an outer dial 31 having an outer diameter of 50 inches in a preferred embodiment. The outer dial contains jacks 36 and the butt ends of needles 35, while an inner dial 32 with an inner diameter of 24 inches contains the hook ends of needles 35. A ring gear extension 33 supports both dials. The knitting is done along the inside diameter known as the forecut 34 while the selection of needles for patterns and knitting changes will be effected in the outer dial 31. The knitting changes are brought about by action of jacks in split pattern drums 37. The jacks 36 will act on needles 35 to select needles as predetermined in three positions of knit, tuck, and welt positions for pattern purposes and also for knitting changes such as to knit with all needles when plain fabric is desired, to tuck all or a selected number of needles in preparation for a selvage edge, to press off all or a selected part of the needles while knitting a selvage edge, and to effect various needle setups, such as "1 x 1" and "2 x 2" while knitting a bottom on the start of a garment.

While my invention is not limited to any particular cut and gauge, I will use a specific cut and gauge where the inside diameter at forecut 34 is 24 inches and the machine contains 1500 needles for a 20 cut knitting machine or about 20 needles per inch. The machine will in these circumstances have 33 feeds and 33 split pattern drums 37 around the outer dial 31. Each split pattern drum 37 will contain 150 jacks and will make ten revolutions to each revolution of the knitting machine. At one point on the knitting machine, between two split pattern drums 37, at 181 will be eight plungers that will be operated by eight chain wheels with eight chains comprising high and low chain links to put the eight plungers in and out of action as predetermined. Conventional and known chain wheels will be used at 181 and will be attached to the outside base of knitting machine. The dials 31 and 32 will rotate in the direction of arrow 182, and the split pattern drums 37 will rotate in the direction of arrow 183. While rotating the split pattern drums 37 will be raised and lowered vertically any combinations of one, two, three, and four steps in both directions as predetermined by chains at 181. The chains at 181 will activate a star wheel and cam stud assembly that is attached to the ring gear extension 33 and will rotate in the ring gear extension to actuate the split pattern drums 37. My invention is not limited to jersey knitting machines as rib knitting may also be done by addition of a cylinder at 38.

Figure 2:
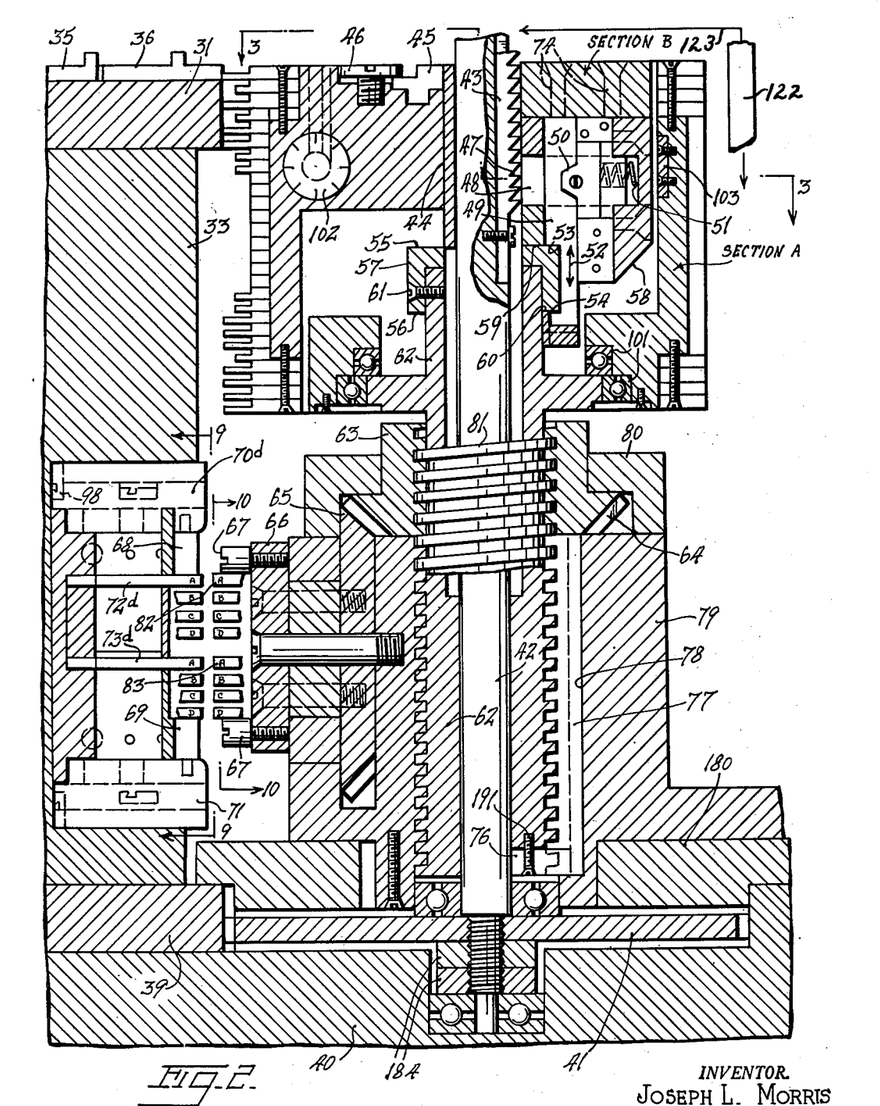
Fig. 2 is an enlarged section on line 2—2 of Fig. 1.

In Fig. 2, the needle 35, ring gear extension 33, outer dial 31, ring gear 39, and base 40 are cut away partially. The outer dial 31 is attached to ring gear extension 33, which is fixed to a ring gear 39 rotating upon base 40.

The ring gear 39 is driven through a train of gears by a suitable motor, not shown, in a conventional and known manner. Preferably, the ring gear 39 has a pitch diameter of 50 inches and drives the patern drum gears 41, which have a pitch diameter of 5 inches, for a ratio of 10 to 1 to equal 1500 needles in the machine and 150 jacks in the pattern drums, which is also a ratio of 10 to 1.

A shaft 42 is attached to the pattern drum gears 41 and locked with two nuts 184. A stepped rack 43 is attached to shaft 42 and one function of the rack 43 is to drive a flanged bushing 44 which is locked to section B of the pattern drum by an eccentric screw lug 45 and lock screw 46. The eccentric screw 45 is also an adjustment means to line up the pattern drum with the machine.

Reference is now made to Fig. 3. A flanged bushing 44 is cut off at 185. The rack 43 attached to shaft 42 drives the flanged bushing 44, which is milled to form a slot and the bushing 44 is adjusted with eccentric screw 45 and is locked with lock screw 46. The shaft 42, bushing 44, rack 43, cam 58, and section B rotate as a unit and this unit drives section A at 186 by another adjustment screw 102 in Fig. 2, which acts on a hardened insert 103 carried by section A (see Fig. 2).

Referring now to Fig. 2, section B rests on the teeth of rack 43 on similar teeth 47 on a rack plunger 48, that is activated outwardly by a slide cam 49 that activates a similarly shaped cam 50 which is attached to rack plunger 48, and rack plunger 48 is biased inwardly by a spring 51. The slide cam 49 moves vertically in the direction of arrow 52, by acme cam 57 acting at 55 and 56 on surfaces 53 and 54 of slide cam 49. Slide cam 49 is in a milled slot on section B cam 58.

Reference is now made to Fig. 3. In Fig. 3 cam 58 is made in two parts joined at 75 and attached to section B at 74. The rack plunger 48 is drilled for a spring 51 and slides in a drilled hole 187. A slot is milled at 188 for the slide cam 49 and cam 50 which are not shown here. The key lug 189 is for a firmer hold on cam 50 which is attached at the key lug. The lower portion of cam 58 is outlined with dotted lines.

Reference is now made to Fig. 2. In Fig. 2 cam 58 is moved vertically in both directions as predetermined by cam action of acme cam 57, at 55 and 56, on cam 58 at 59 and 60. Cam 57 moves first and cam 58 follows in all vertical movements. Cam 57 is moved vertically by acme screw 62. The acme screw 62 is in a fixed position and has only a vertical motion in both directions, so that cam 57, which is attached at 61 to acme screw 62, is in a fixed position and also only moves vertically in both directions. Cam 58 rotates and also moves vertically in both directions. The various vertical movements will be explained in detail in Figs. 4, 5, 6, 7 and 8.

As shown in Fig. 2, the acme screw 62 is prevented from rotating by a key 76 attached at 191 to acme screw 62. The key 76 rides up and down in a keyway insert 77 which is attached at 78 to bracket 79. The acme screw 62 moves vertically in both directions by turning the acme screw nut 63 in both directions through 90, 180, 270 or 360 degrees. The acme screw nut 63 is prevented from moving vertically by plate 80 which is attached to bracket 79. The threads 81 on acme screw 62 will be in two sizes, one of which will be four threads per inch, to shift the screw one quarter of an inch by a full turn of acme screw nut 63. Another size of threads will be two threads per inch and will shift the screw one half inch for a full turn of acme screw nut 63. The two threads per inch will be the preferred form of acme screw 62, where a full turn of nut 63 gives a movement of one half inch or four steps of one eighth inch for each step and a three-quarter turn of nut 63 gives two one-eighth inch steps and a quarter turn of nut 63 gives a single one-eighth inch step. The vertical direction that screw 62 will move will depend on which direction the nut 63 is turned.

The nut 63 is made with gear teeth 64 which are turned by another gear 65, and gear 65 is turned by a stud wheel 66 having eight studs 67 which are moved by cam studs 68 and 69. The studs 68 are on upper cams 70 and the studs 69 are on lower cams 71. There are two studs on each cam and there are four upper cams to give stud wheel 66 one turn in one direction, and four lower cams to give stud wheel 66 one turn in the opposite direction. The upper cams 70 and the lower cams 71 are put into action by star wheels 72 and 73 which are activated by plungers 82 and 83. These are actuated, in turn, by high and low links on eight chains.

Figure 9:
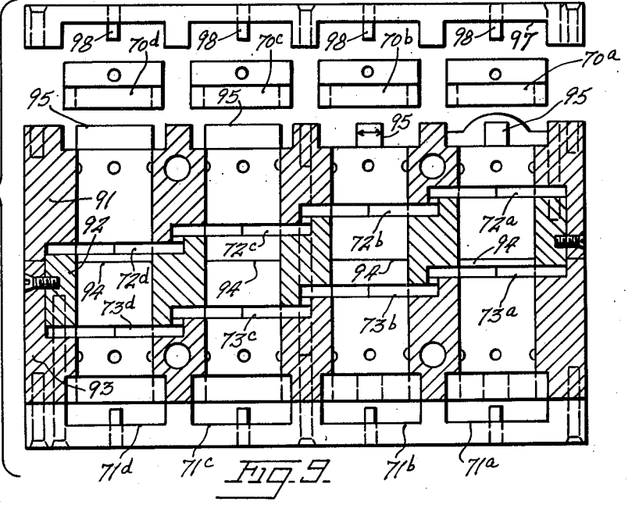
Fig. 9 is a vertical section on line 9—9 of Fig. 2, showing the star wheel and stud cam assembly, the upper portion being shown exploded.
Figure 9A:
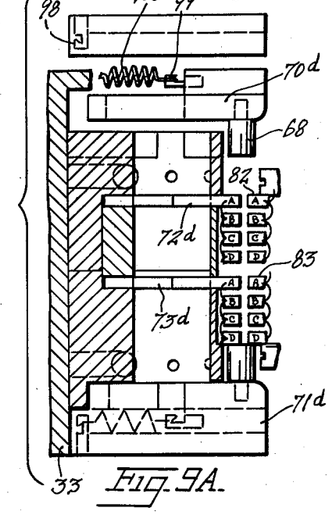
Fig. 9A is a view of said assembly as seen from the left of Fig. 9.
Figure 9B:
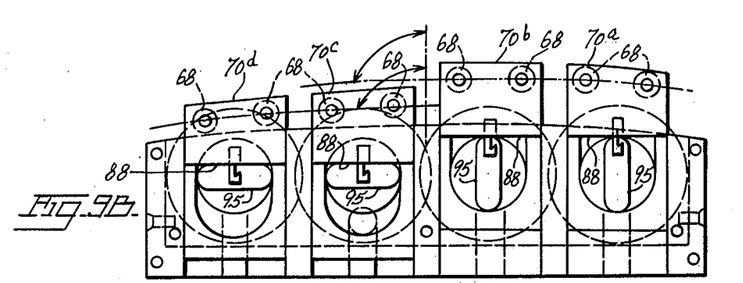
Fig. 9B is a top plan view of the star wheel and stud cam assembly.
Figure 9C:
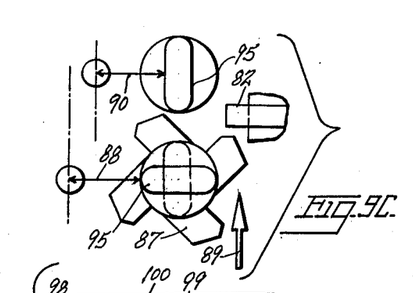
Fig. 9C is an exploded top plan view of one of the start wheels and associated stud cam.

Reference is now made to Fig. 9 showing the star wheel and stud cam assembly. The assembly comprises four upper star wheels 72A, 72B, 73C, 72D and four lower star wheels 73A, 73B, 73C, 73D. The star wheels are supported by a container formed in three pieces 91, 92, 93 which are milled, bored, and counterbored for each star wheel and are screwed together. The star wheels are split at 94 and the top is milled to form an activating lug 95. The lug 95 actuates at 88 and releases at 90 the upper stud cams 70A, 70B, 70C, 70D and the lower stud cams 71A, 71B, 71C, 71D. A spring 100 is connected between a hook 99 on each of the stud cams and a hook 98 on the cover plate 97. When lugs 95 release the stud cams at 90 the springs 100 return the stud cams to their normal position. The complete assembly is attached to ring gear extension 33 and rotates around the machine. According to the movements desired eight chains are made of high and low links and these eight chains activate four upper plungers 82A, 82B, 82C, 82D and four lower plungers 83A, 83B, 83C, 83D. The plungers activate four upper star wheels 72A, 72B, 72C, 72D and four lower star wheels 73A, 73B, 73C, 73D and then activate four upper stud cams 70A, 70B, 70C, 70D and four lower stud cams 71A, 71B, 71C, 71D.

Figure 10:
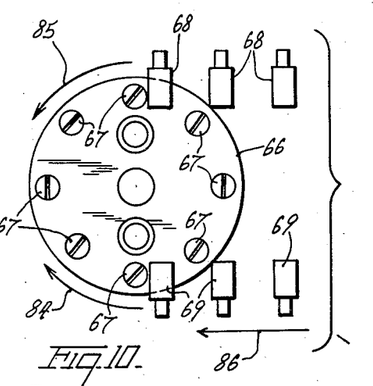
Fig. 10 is a front elevational view of the stud wheel, as viewed from line 10—10 of Fig. 2.

Reference is now made to Fig. 10 which shows the movements of stud wheel 66. In Fig. 10 the upper cam studs 68 and the lower cam studs 69 travel in the direction of arrow 86 and only the upper or lower studs will be in action at any one time and never both at the same time. When the upper cam studs 68 are in action the stud wheel 66 will turn in the direction of arrow 85. When the lower cam studs 69 are in action the stud wheel 66 will turn in the direction of arrow 84 which provides for a forward and a reverse movement of stud wheel 66. There are eight studs 67 on stud wheel 66 and two studs on each of the four lower and four upper stud cams. One stud can will turn stud wheel 66 one quarter turn; two stud cams will turn stud wheel 66 one half turn; three stud cams will turn stud wheel 66 a three-quarter turn; four stud cams will turn stud wheel 66 one full turn. By selecting upper and lower stud cams a forward and a reverse movement is provided which when transmitted to the acme nut 63 causes a vertical movement to be transmitted to the acme screw 62 in both directions in any combination of one, two, three, and four steps in both directions. At 87 is shown the size and shape of a star wheel in relation to the activating lug 95.

Figure 11:
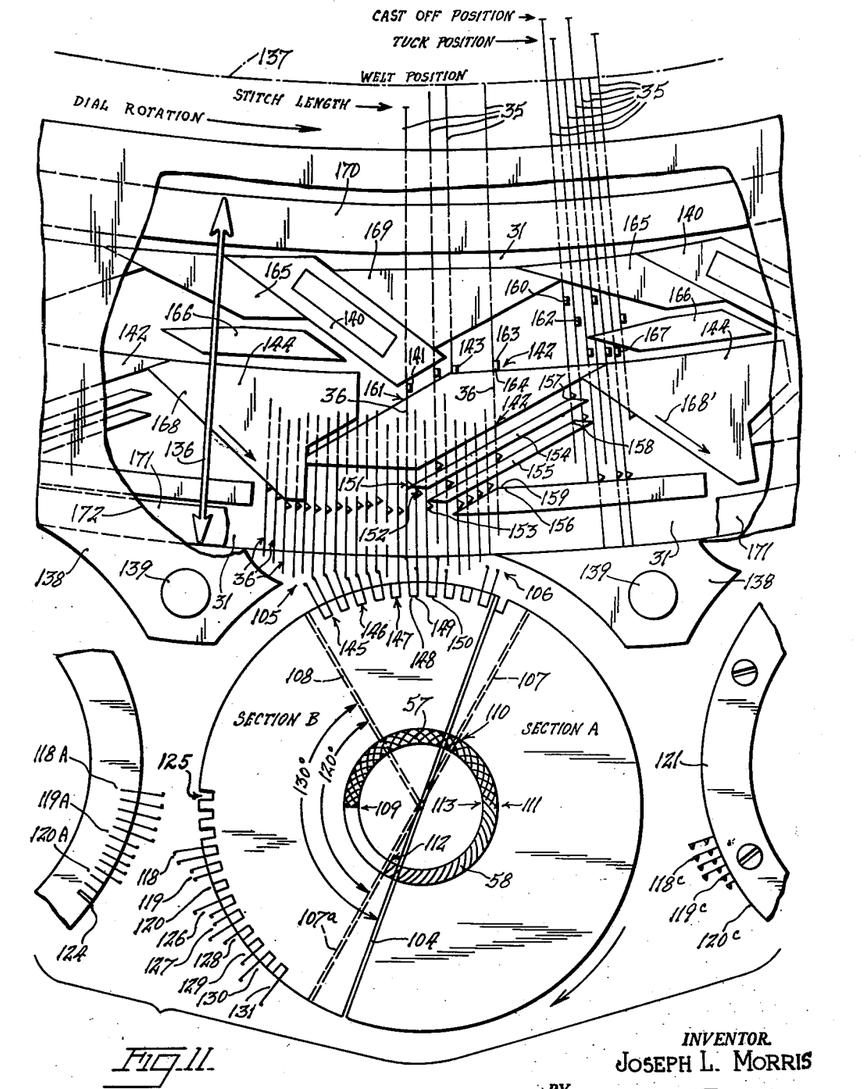
Fig. 11 is a top plan view, largely diagrammatic, of a pattern drum and a portion of the outer dial.

Reference is now made to Fig. 2. In Fig. 2 section A rotates on ball bearings 101 on acme screw 62 and is driven by adjustment screw 102 on section B which acts on a hardened insert 103 on section A. Section A and section B rotate as a unit. The vertical movements of sections A and B are in the following sequence: Section A is moved first by acme screw 62 a predetermined number of steps in either vertical direction and section B follows at a later moment the same number of steps and direction that section A has moved. Section A is raised and lowered by the acme screw 62 and section B is raised and lowered by the position of acme cam 57 which is attached at 61 to acme screw 62. For the timing, reference is now made to Fig. 11. In Fig. 11 section A and section B are split and the split is represented by a double line 104. In this position section B is in contact with machine jacks from point 105 to point 106 while section A is not in contact with machine jacks. By moving the line 104 to the position of dotted line 107 and 107A the position is established where section A will start its vertical movement and finish its vertical movement when 107A reaches 108 a total of about 120 degrees for vertical movements. When section B reaches the same position at line 107 and 107A it will also start its vertical movement and finish when 107A reaches 108. In the diagram section B must make a one-half turn to reach position 107 and 107A for vertical movement. The acme cam 57 is in its fixed position and the low point of the cam is at 109 while the high point of the cam is at 110 and the distance between 110 and 111 is an extension of the high point of cam 57. In the diagram the revolving cam 58 is in position as shown when the low point is at 112 and the high point is at 113.

When section B makes a one-half turn from present position at 107 and 107A to a new position at 107 and 107A the low point 112 will be at 110 and the high point 113 will be at 109.

Figures 4, 5, 5A, 6, 7, 8, 12, 13, 14, 15:
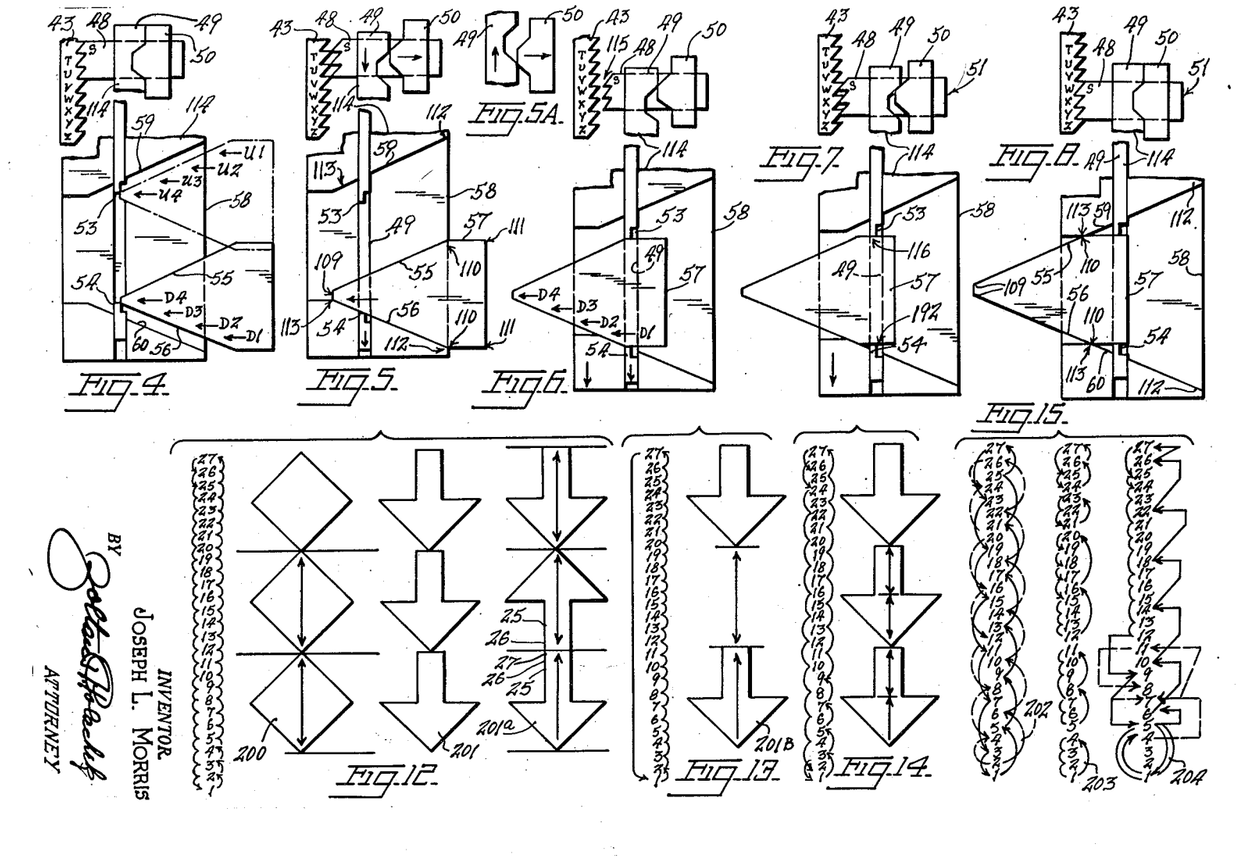
Figs. 4, 5, 5A, 6, 7 and 8 are schematic showings of various vertical movements of a cam and slide cam that act upon a rack included in the invention.
Figs. 12, 13, 14 and 15 are diagrams to show various step movements of a pattern drum.

Reference is now made to Fig. 5 in which can be seen the various low and high points on cams 57 and 58. In the position shown in Fig. 5 the cam 58 is in position to be lowered four steps when high point 113 on cam 58 reaches high point 110 on cam 57 as seen in Fig. 8.

Reference is now made to Figs. 4-8. In Fig. 4 the revolving cam 58 which is attached to section B is broken at 114 and the upper portion is turned around so that one can see movements clearly. The acme cam 57 is lowered to any of the four steps D1, D2, D3, D4 or raised to any of the four steps U1, U2, U3, U4 shown by dotted line outline of cam 57 which would be in position U4 to raise cam 58 four steps. In Fig. 4 the acme cam 57 is in position D4 to lower cam 58 a distance of four steps. A portion of rack 43 is shown with seven teeth marked T, U, N, W, X, Y, Z and the top tooth marked S on rack plunger 48 is at present resting on rack tooth T. As the cam 54 on the slide cam 49 contacts the acme cam 57 the cam 54 is moved downwardly to open the rack plunger 48 as see in Fig. 5, in which cam 54 has been moved down to also move slide cam 49 down, which cam 49 has previously acted on cam 50 to open rack plunger 48. Due to the shape of slide cam 49 and 50 the same results are obtained when slide cam 49 is raised, as shown at 192. Fig. 5 shows the first movement to open rack plunger 48 for all downward movements D1, D2, D3, D4 and all upward movements U1, U2, U3, U4 of cam 58. In Fig. 6 the cam 58 has been lowered three steps to position D1 and has one more step to finish its movement. Tooth S on rack plunger 48 is at tooth W on rack 43 as shown at 115. Fig. 6 is also in position for D1 or down one step.

In Fig. 7 the cam 58 has been lowered only one-half step and slide cam 49 does not make any vertical movement, as cam 53 at 116 and cam 54 at 192 can not move in either vertical direction. However, the cam 58, cam 50 and rack plunger 48 have been lowered one-half step to cause cam 50 to start to close by spring 51 acting on rack plunger 48. In Fig. 8 the cam 58 has been lowered the other one-half step and slide cam 49 remains in the same position and makes no vertical movement as cams 53 and 54 are prevented from moving in either direction. Cam 58, cam 50 and rack plunger 48 have been lowered the other one-half step to close rack plunger 48 by spring action 51 and rest tooth S on tooth X, a total of four steps from Fig. 4 to Fig. 8. One step would be from Fig. 6 to Fig. 8. Two steps would be from Fig. 5 at D2 to Fig. 8. Three steps would be from Fig. 5 at D3 to Fig. 8. The upward movements of cam 58 are basically the same in the opposite directions.

In Fig. 8 all cams are in neutral position and no further vertical movements are made until cam 57 is either raised or lowered. Reference is now made to Fig. 2. In Fig. 2 slots 117 are cut around the complete pattern drum the length of the pattern drum. The number of slots 117 will vary according to the number of needles in the knitting machine. Knit jacks 118, tuck jacks 119, and blank welt jacks 120 will be placed into the slots to fill each slot. The jacks 118, 119, 120 will be arranged according to patterns and knitting changes desired.

In addition, plates 121 with jacks attached thereto, will be attached to both ends of both pattern sections at 193 and 194. The plates 121 will be stamped with all jacks on and jacks broken off for the pattern and knitting changes desired. When the plates 121 are screwed together pressure will be applied to the jack inserts between the plates. The jacks in the pattern drum will act upon the jacks 36 in the outer dial 31 and jacks 36 will act upon the needles 35 on other jacks if so desired.

In the upper right-hand corner a bracket extension 122, which is broken off at both ends, will be extended down to bracket 79 and over to shaft 42 by arrow 123 when the arrow 123 is raised the distance to clear the pattern drum in its highest position, and its purpose is to support the top end of shaft 42.

Reference is now made to Fig. 11. In Fig. 11 the slots 125 will be wide enough to receive double jacks 118 through 131. This method will be used on fine gauge machines of about 16 needles per inch to about 30 needles per inch. The slots 125 will be around the complete pattern drum. In coarser gauge machines having from about 15 needles per inch to one needle per inch, single slots 124 will be cut around the pattern drum to receive single jacks 118A, 119A, 120A. The pattern plates 121 will be stamped with all jacks 118C on and broken off to form jacks 119C and blanks 120C as required. At 132 and 133 are top and side outlines of single jacks and at 134 and 135 are top and side outlines of double jacks.

The outer dial 31 is about the width of open arrow 136 and slots, not shown, will be cut around the dial in the conventional manner the full width of arrow 136. The broken line 137 represents the inner edge of the inner dial known as the forecut 34 shown in Fig. 1. In Fig. 11 the needles 35 have all been broken off to the same size to show cast off, tuck, welt, and stitch length in relation to 137. The dial rotates in the direction of the arrow shown, and the pattern drum also rotates in the direction of the arrow shown. The dial cap 138, which is broken off along line 172, is milled and cut to permit the pattern drum jacks to function without interference, and will rest on posts through holes 139. The dial cap 138 may also rest and ride on the outer dial in the conventional manner.

Knitting is done in the conventional manner, and thus, 140 is a stitch cam with a needle butt 141 at the lowest and stitch length point of knitting. Cam 142 is a raise cam that raises needle butts to welt position at butt 143. Cam 144 is a jack return cam that places jacks 36 into position to be selected by the pattern drum at 105. At 145 pattern drum jacks contact jacks 36 for cast off position, and at 146 pattern drum jacks contact jacks 36 for tuck position. At 147 a blank jack in the pattern drum will make no contact with jacks 36 for welt position. As the pattern drum and outer dial rotate together, jack 145 raises jack 36 to position 148 and jack 146 raises jack 36 to position 149 and blank jack 147 allows jacks 36 to remain in the low position 150. Butt 151 on jack 36 has been raised about one quarter inch and butt 152 on jack 36 has been raised about one eighth inch, while butt 153 on jack 36 remains in the low position. The butts 151, 152, 153 are separated one eighth of an inch apart from the center of one butt to the center of the next butt.

At this point, the separation cam 154 picks up butt 151 and raises it to cast off position 157, which in turn raises the needle butt 160 to cast off position. Jacks 36 contact needle butts 141 at 161 for cast off position. The separation cam 155 picks up butt 152 and raises it to tuck position at 158, which raises needle butt 162 to tuck position. Jacks 36 contact needle butts 163 at 164 for tuck position. The separation cam 156 picks up butt 153 and raises it to welt position at 159 and makes no contact with needle butts. Cams 165 and 166 direct butts 160 and 162 to the stitch cam 140 for knitting and tucking while butts 167 pass through in welt position. Cam 144 returns, at 168, jacks 36 to the selected position at the next feed.

Figure 11A:
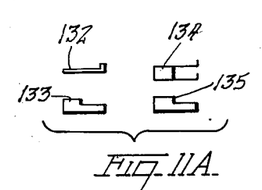
Figs. 11A, 11B and 11C show improved separation butts for knitting machine instruments.
Figure 11B:
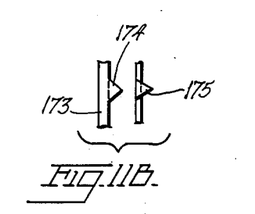
Figure 11C:
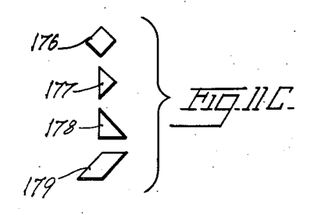

The butts 151, 152, 153 are shaped in the form of a half diamond. This shape, it has been found, constitutes a distinct improvement over existing butts used on knitting instruments. The improved butt may be stamped as shown at 173, and by bending at 174 a half diamond shape is formed at 175. The purpose of the improved butt is for separation purposes, with a minimum of distance between butts required, and with instant reciprocating movements. The improved butts will take various shapes such as a diamond at 176, a half diamond at 177, a triangle at 178, and an irregular shape at 179.

In Fig. 11 cams 169, 170, 171 are guard cams. All cams are attached to the dial cap 138 in the conventional manner.

Reference is now made to Figs. 12 to 15. Cognizance is taken of the fact that various methods are used to create patterns, and my improved method applies to a constant rotating split pattern drum that reciprocates vertically in both directions a plurality of steps in both directions and that is applied to multiple feed circular knitting machines. To the best of my knowledge, there is no known method to create patterns and make knitting changes with the same device, to eliminate such prior art devices as tuck bars, selvage edge devices, "2 x 2" set-up devices, half-cardigan devices, French welt devices, and the various other attachments required to activate these devices as well as the various special cams required. With my method it is practical to make these changes without interference with other functions as will fully be explained in Fig. 16.

I believe that on certain flat knitting machines, a flat strip is used that moves forwardly and rearwardly two steps to create patterns, a similar one being used to make knitting changes. These comprise two units. In that method all needles are selected simultaneously, and the method can not be used on a rotating circular knitting machine. Various "trick" wheels move levers at variable steps and the wheel itself does not travel vertically.

Reference is made to Fig. 12. In Figs. 12, 13, 14, 15 the numbers 1 to 27 represent steps on a pattern drum. In Fig. 12, then, a pattern drum moves vertically only one step at a time and irregular repeat patterns can not be created. For example, if the diamond outline 200 requires 27 steps it can be made by moving the pattern drum one step at a time from 1 to 27 and then from 27 to 1 to repeat the pattern. The diamond is a similar shape and such patterns can be produced.

The objection of this method is that irregularly shaped patterns such as 201 can not be repeated. At 201A the jacks are set up to produce steps 25, 26, 27 on the upward movement of the drum one step at a time and when the drum returns from 27 to 26 to 25 it repeats the end of the pattern and does not start a new pattern at the beginning. One method to overcome this objection is shown in Fig. 13, where the drum moves vertically one step at a time from 1 to 27 to produce the pattern 201B and on the downward movement 27 to 1 the machine knits plainly and creates a space between patterns, which is also objectionable.

In Fig. 14 these objections are eliminated by moving the drum two steps at a time starting at 1 to 3 to 5, etc., to 27 to complete one-half the pattern and by then returning downwardly two steps at a time, 26 to 24 to 22, etc., to 1 to start a new pattern at the beginning.

In Fig. 15 are shown further improvements, where at 202 two different patterns may be set up and only one pattern used when desired. The dotted line produces one pattern by moving up 4 steps at a time starting at 2, to 6, to 10, to 14, to 18, to 22, to 26, and returning. This shows 2 steps from 26 to 24, then four steps at a time to 20, to 16, to 12, to 8, to 4, and two steps to starting point 2.

At 202 the dark lines will produce a different pattern by starting at 1 and moving up four steps at a time to 5, to 9, to 13, to 17, to 21, to 25, and two steps to 27, then down four steps at a time to 23, to 19, to 15, to 11, to 7, to 3, and two steps to the starting point 1. At 203 is a variation where five different patterns are set up. At 204 the method is further improved by making knitting machine changes with the same pattern drum. One pattern setup for the body in knitted garments is started at 6 and the drum is moved up 4 steps to 10, to 14, to 18, to 22, to 26, and one step to 27, then down to 25, to 24, to 23, to 21, to 20, to 19, to 17, to 16, to 15, to 13, to 12, to 9, and to 5, which is the end of the pattern. The drum may now proceed to 6 to start a new pattern or move down to 1 to make knitting machine changes such as a selvage edge at step 1 and various other changes at 2 and 3 and 4 such as "2 x 2" setup, "1 x 1" setup, half-cardigan, etc. From 4, the drum may go to 7 to 11 to 8 to create a different pattern such as that in the cuff of a garment and from 8, the drum may go back to 4 to finish the cuff and then go to 6 to start the body and a new pattern.

Figure 16:
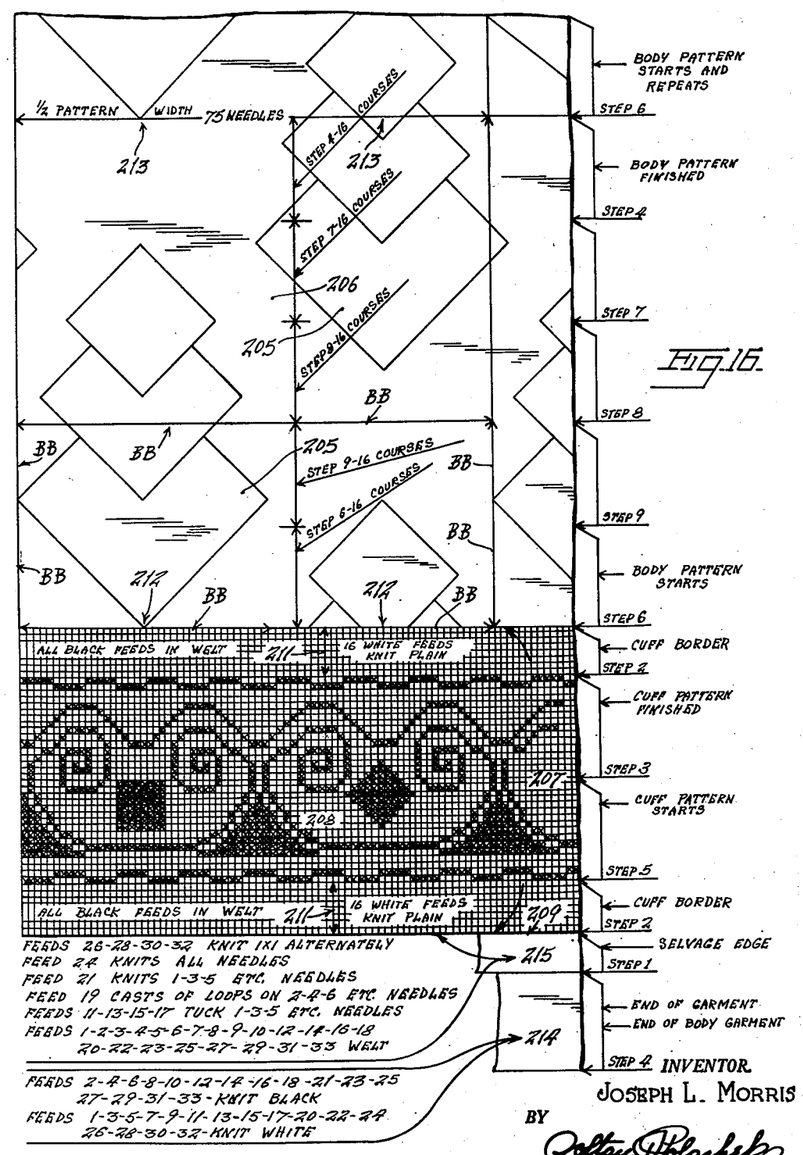
Fig. 16 is a diagram of a knitter's layout for a garment with one pattern in the cuff, a selvage edge on the cuff, and a different pattern on the body.
Figure 16A:
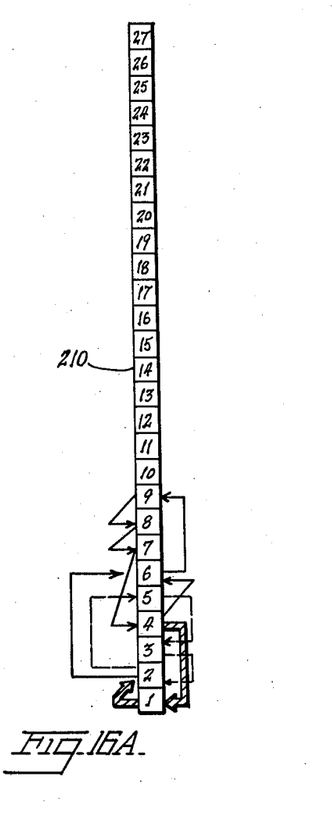
Fig. 16A is a diagram showing the steps of pattern drum movement in working with the Fig. 16 layout.

Reference is now made to Fig. 16, wherein the pattern 205 is in the body 206 of a knitted polo shirt that will be made on a jersey knitting machine with my invention applied to make patterns and knitting changes. In the cuff 207 a different pattern 208 will be made with a selvage edge 209 at the start of the cuff. The machine has 33 feeds and 133 pattern drums, with 32 feeds being used for knitting and one feed being used for casting off loops at the selvage edge. The patterns are laid out on large block paper and jacks are placed into the pattern drums according to patterns. Knitting changes are also made by jacks in the pattern drums as, for example, when a selvage edge 209 is made various knitting changes are required. The numbers 1 to 27 in the blocks at 210 represent the steps in the pattern drums, and nine steps will be used to produce a selvage edge 209, a border in the cuff 207, a pattern 208 in the cuff, and a different pattern 205 in the body 206 of the garment. The pattern drums are set up with jacks where step 1 will make the various knitting changes to produce a selvage edge and step 2 will make the knitting changes to knit a border 211 in the cuff 207, and steps 3 and 5 will knit the pattern 208 in the cuff 207 and steps 4, 6, 7, 8, 9 will knit the pattern 205 in the body 206.

The pattern 205 is started at 212 with step 6 and finished at 213 with step 4, that is, the pattern drums will start pattern 205 with step 6 and the drum will move up three steps to 9, down one step to 8, down one step to 7, and down three steps to 4, to finish the pattern 205. To repeat the pattern several times, the drum will move from step 4 to step 6 to start a second repeat pattern, and this sequence is continued until the body 206 of the garment is finished. The machine has 33 feeds with 32 feeds being used for knitting, and one feed 19 being used for casting off loops at the selvage edge. There is a pattern drum on every feed.

The patterns will be in one color, so that 16 feeds will knit block patterns and 16 feeds will knit a white background. The arrangement requires two feeds for each course of pattern knitting, so that in one revolution of the knitting machine, 16 courses of pattern are knitted. In other words, each step on the pattern drums knit 16 courses of pattern and as it takes five steps to knit pattern 205, the pattern will be 80 courses high.

At 214 the garment length is finished and all pattern drums are on step 4, which is also the end of body pattern 205 at 213. The machine is knitting block yarn to produce the pattern on feeds 2, 4, 6, 8, 10, 12, 14, 16, 18, 21, 23, 25, 27, 29, 31, 33 and white yarn to produce the background on feeds 1, 3, 5, 7, 9, 11, 13, 15, 17, 20, 22, 24, 26, 28, 30, 32. At 215 the selvage edge is made and the knitting changes required are made on step 1 of the pattern drum where the feeds 1, 2, 3, 4, 5, 6, 7, 8, 9, 10, 12, 14, 16, 18, 20, 22, 23, 25, 27, 29, 31, 33 are put out of action by blank jacks in the pattern drums on those feeds.

Blank jacks welt the needles and these needles do not rise to receive yarn. Feeds 11, 13, 15, 17 tuck needles 1, 3, 5, 7, etc., and knit needles 2, 4, 6, 8, etc., by high and medium jacks in the pattern drums on those feeds. Feed 19 casts off loops on needles 2, 4, 6, 8, etc., by high jacks in the pattern drum. As there is no yarn on this feed the needles will cast the loops off. Feed 21 knits needles 1, 3, 5, 7, etc., for the draw thread by high jacks on the pattern drum. Feed 24 knits all the needles by high jacks on the pattern drum and this is the start of the cuff.

A latch opener is at this feed to open the latches on the needles that were cast off. Feeds 26, 28, 30, 32 knit one and welt one, and alternate to knit the edge of the cuff, and this is done by the high and blank jacks in the pattern drums. This completes all the knitting changes made with step 1.

From step 1 the pattern drums move to step 2, to produce the border 211 on the cuff 207. Only feeds 1, 3, 5, 7, 9, 11, 13, 15, 17, 20, 22, 24, 26, 28, 30, 32 are put into knitting by a high jack on the pattern drums in the designated feeds. The rest of the feeds are put out of action by blank jacks on the pattern drums associated therewith. This produces a plain knit white border, as the knitting feeds all have white yarn. That completes the knitting changes in step 2.

From step 2 the pattern drums move to step 5 and then to step 3 to knit 32 courses of pattern in the cuff. The jacks are set up according to the pattern on steps 5 and 3. From step 3 the pattern drums move the pattern drums back to step 2 to produce the border 211 once more at the top of the cuff 207.

From step 2 the pattern drums move to step 6 to start the body 206 and pattern 205, and the pattern drums move from step 6 to 9, to 8, to 7, to 4, to 6, to 9, to 8, to 7, to 4, and keep repeating this sequence until the length of the garment is finished at 214. On jersey knitting a stripper attachment is not required in the knitting changes when a feed is thrown out of action by blank jacks in a pattern drum. The yarn remains in the yarn guide hole and travels around the machine with the last needle that knitted. To resume knitting, needles are simply put into action with the first needle being put into action to take the loose end of the yarn and start knitting again.

Figure 18:
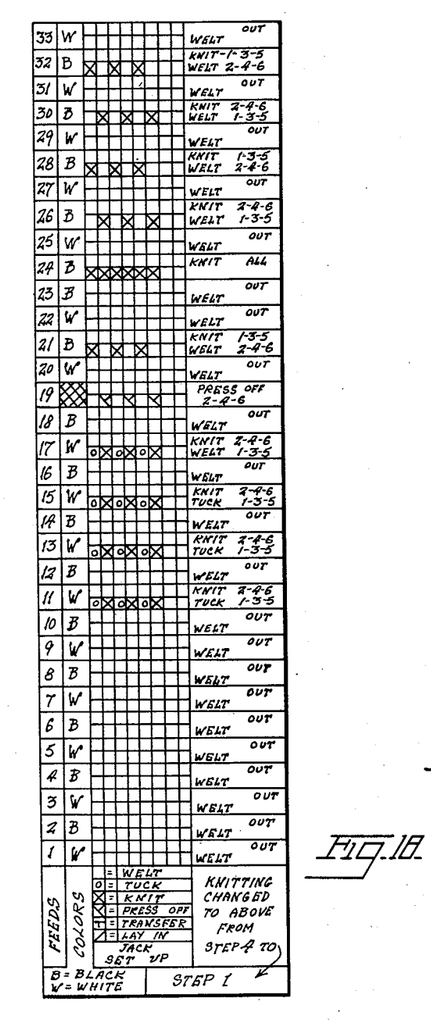
Fig. 18 is a diagram of a knitter's layout for step 1 on the pattern drum, used for knitting the selvage edge of the cuff.

Reference is now made to Fig. 18, which is a knitter's layout for step 1 on the pattern drums. Symbols are used and the diagram is self-explanatory. From step 4, which is knitting all feeds except #19, a sample change is made in the knitting with step 1 on the pattern drums, without the use of the usual devices and attachments which are necessary on present knitting machines. With my improved method and device it is possible to eliminate all such devices and attachments from the knitting machine and make all the required changes from the same device that creates patterns. On present machines high and low butts are used for various setups such as "1 x 1" and "2 x 2." With my method and device I eliminate that also, as can be seen on feeds 26, 28, 30, 32 where alternate "1 x 1" knitting is done. When my method and device is used on a rib machine a stripper will be necessary to throw yarns out of action when a feed is thrown out of action.

Figure 17:
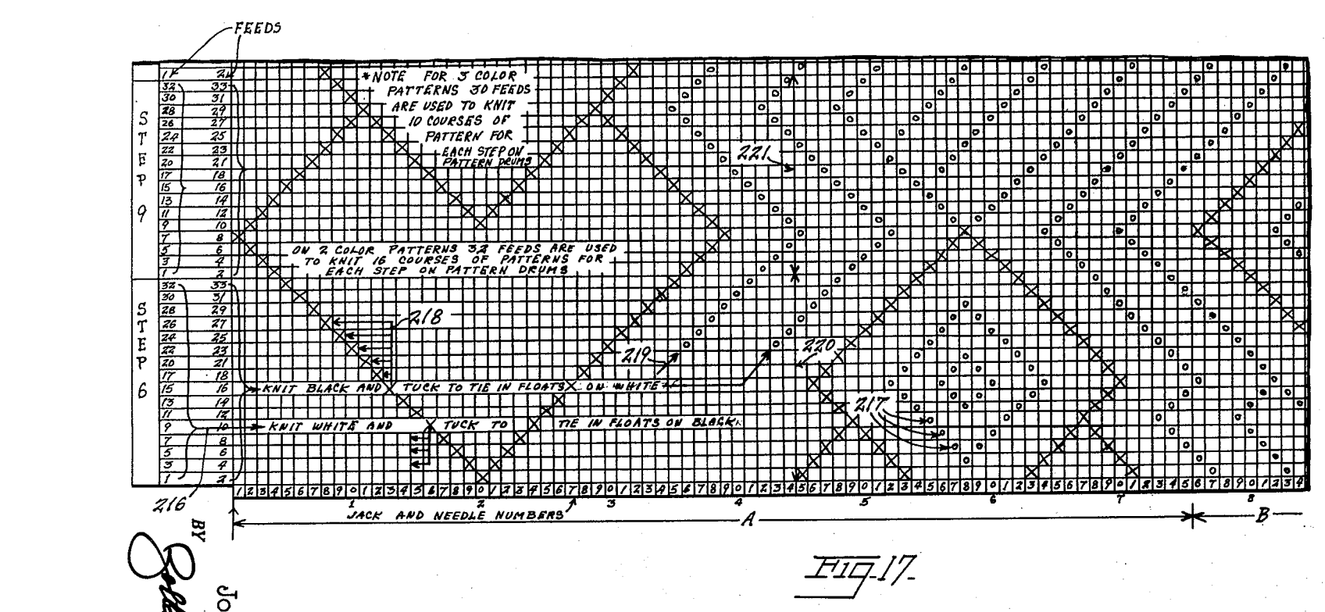
Fig. 17 is a diagram of outline BB of Fig. 16, and is a knitter's layout of two steps of pattern 205 on section A of pattern drum.

Reference is now made to Fig. 17 which is a knitter's layout of only two steps of the pattern drums and only one half of the pattern drums, this being section A, which covers 75 needles. It is a repeat pattern and section B is the same as section A on this particular pattern. It is a two color pattern which means that 16 feeds are used to knit the white background 216 and tie-in floats 217 on block pattern, and 16 feeds are used to knit a black pattern 218 and tie-in floats 219 on white background.

This is the conventional method of knitting and tie-in of floats and is well known and standard procedure with all types of pattern devices.

With 32 feeds knitting, 16 courses of pattern are produced for each step of the pattern drums, and this can be seen where in step 6 feed #2 knits needle #20 of the pattern, feed #4 knits needles #19 and #21 of the pattern, feed #6 knits needle #18 and #22 of the pattern, and so on up to feed #33 which knits needles #5 and #35.

The chains that control the vertical movements of the pattern drums move one link between feeds #33 and #1 and the pattern drums in this instance are raised from step #6 to step #9. On this revolution feed #2 knits needles #4 and #36 of the pattern and feed #4 knits needles #3 and #37 and so on to continue the pattern that has been predetermined. Step 6 knits 16 courses 220 and step 9 knits 16 courses 221, and so on for as many steps as are used. Pattern 205 has five steps 6, 9, 8, 7, 4 and is therefore 80 courses high. This particular pattern is a repeat pattern of 75 needles and therefore both sections of the pattern drums will be set up the same. For a pattern 150 needles wide, the complete pattern drum will be set up and for wider patterns, say of 300 needles, two patterns will be set up to produce one pattern width and so on up to a pattern width of 1500 needles, where all the drums are used to produce one width.

The variations in the width are unlimited, and the height is only limited by the number of steps which may be increased if so desired. The number of steps can be increased, for instance, by making the drums longer in length to about 40 steps, and on two color patterns this with give a height of 640 courses which is more than ample.

Figures 19, 20:
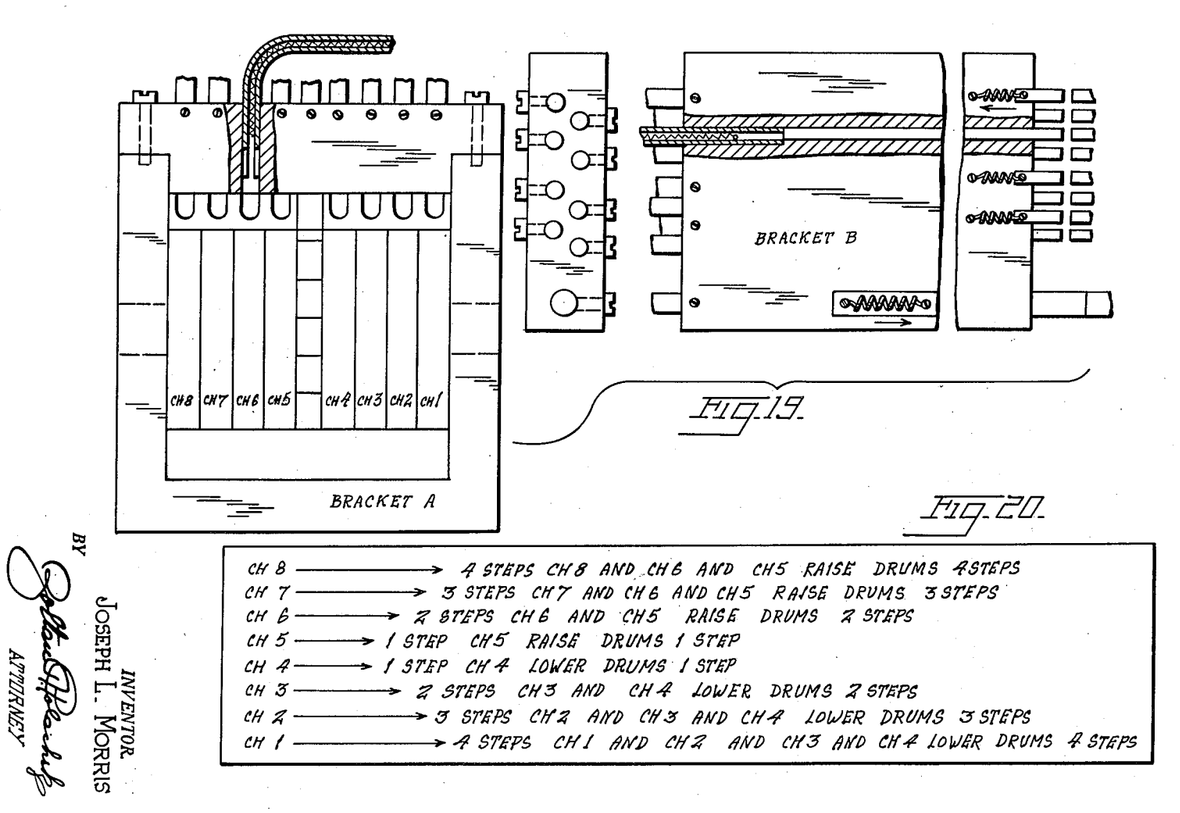
Fig. 19 is an exploded, largely diagrammatic showing of an 8 chain wheel system, for use with 4 step reciprocating drums in both directions.
Fig. 20 is a diagram showing the functions of an 8 chain system.

Reference is now made to Fig. 19 which is a diagram of an 8 chain system, in which high and low links on chains, not shown, will activate the plungers, to in turn activate the star wheels, which in turn activate the stud cams, which then activate the stud wheels. These activate the gears on the screw nuts, thus to raise and lower the screw which raises and lowers the pattern drums a variable number of steps in both directions as predetermined by the high and low links on the chain wheels outlined in Fig. 20. If desired, more chain wheels may be added, provided the screw is altered as well as the stud cams and stud wheels.

While I have illustrated and described the preferred embodiment of my invention, it is to be understood that I do not limit my self to the precise construction herein disclosed and that various changes and modifications may be made within the scope of the invention as defined in the appended claims.

Having thus described my invention, what I claim as new, and desire to secure by United States Letters Patent is:

1. In a mutliple feed circular knitting machine having a series of slidable needles and jacks, a plurality of Jacquard mechanisms arranged for effecting activation of individual needles and jacks into full knit, tuck, and welt positions and each including a split pattern drum mounted to rotate and to shift vertically in both directions during rotation thereof, said drum shifting through a variable number of predetermined steps in both directions, there being longitudinal slots formed in said drum to receive jacks in three different lengths, said jacks being adapted to be inserted into said slots in a succession of predetermined steps, one jack on top of another over the full lengths of said slots with the jacks arranged according to patterns and knitting operations desired, split discs attached to both ends of said drum and exerting pressure on the jacks tending to hold the same together, said split discs having the jacks attached thereto and said jacks being arranged to be broken off according to patterns and knitting operations desired, said jacks being mounted to directly activate other jacks, the latter jacks being disposed to activate the needles, the jacks of greatest length in said drum being arranged to raise needles into full knitting position, the jacks of medium length being arranged to raise needles into tuck position, and the jacks of shortest length being arranged to allow needles to remain in welt position.

2. In a multiple feed circular knitting machine having a series of slidable needles and jacks, a plurality of Jacquard mechanisms arranged for effecting activation of individual needles and jacks into full knit, tuck, and welt positions and each including a split pattern drum mounted to rotate and to shift vertically in both directions during rotation thereof, said drum shifting through a variable number of predetermined steps in both directions, there being longitudinal slots formed in said drum to receive jacks in three different lengths, said jacks being adapted to be inserted into said slots in a succession of predetermined steps, one jack on top of another over the full lengths of said slots with the jacks arranged according to patterns and knitting operations desired, split discs attached to both ends of said drum and exerting pressure on the jacks tending to hold the same together, said split discs having the jacks attached thereto and said jacks being arranged to be broken off according to patterns and knitting operations desired, said jacks being mounted to directly activate other jacks, the latter jacks being disposed to activate the needles, the jacks of greatest length in said drum being arranged to raise needles into full knitting position, the jacks of medium length being arranged to raise needles into tuck position, and the jacks of shortest length being arranged to allow needles to remain in welt position, said split pattern drum being formed of first and second sections, means in the form of a hollow flanged screw for raising and lowering the drum a variable number of steps in both directions, a corresponding screw nut gear adapted to be turned in both directions variable distances, a second gear for turning the first gear, a stud wheel turnable in both directions variable distances, the second gear being attached thereto, means including a plurality of upper and lower stud cams for turning the stud wheel, the number of stud cams in action being adapted for determining the distance the stud wheel is turned, and the upper and lower stud cams further determining the direction the stud wheel is turned, a plurality of upper and lower star wheels for putting the cams into and out of action, and a plurality of control chains for predetermining the movement of the star wheels.

3. In a multiple feed circular knitting machine having a series of slidable needles and jacks, a plurality of Jacquard mechanisms arranged for effecting activation of individual needles and jacks into full knit, tuck, and welt positions and each including a split pattern drum mounted to rotate and to shift vertically in both directions during rotation thereof, said drum shifting through a variable number of predetermined steps in both directions, there being longitudinal slots formed in said drum to receive jacks in three different lengths, said jacks being adapted to be inserted into said slots in a succession of predetermined steps, one jack on top of another over the full lengths of said slots with the jacks arranged according to patterns and knitting operations desired, split discs attached to both ends of said drum and exerting pressure on the jacks tending to hold the same together, said split discs having the jacks attached thereto and said jacks being arranged to be broken off according to patterns and knitting operations desired, said jacks being mounted to directly activate other jacks, the latter jacks being disposed to activate the needles, the jacks of greatest length in said drum being arranged to raise needles into full knitting position, the jacks of medium length being arranged to raise needles into tuck position, and the jacks of shortest length being arranged to allow needles to remain in welt position, said split pattern drum being formed of first and second sections, means in the form of a hollow flanged screw for raising and lowering the drum a variable number of steps in both directions, a corresponding screw nut gear adapted to be turned in both directions variable distances, a second gear for turning the first gear, a stud wheel turnable in both directions variable distances, the second gear being attached thereto, means including a plurality of upper and lower stud cams for turning the stud wheel, the number of stud cams in action being adapted for determining the distance the stud wheel is turned, and the upper and lower stud cams further determining the direction the stud wheel is turned, a plurality of upper and lower star wheels for putting the cams into and out of action, and a plurality of control chains for predetermining the movement of the star wheels, said machine further including a rack on which the second section rests, a driving shaft, a rack plunger, a sectional cam housing the plunger and attached to the second drum section, the plunger being arranged to connect the rack to the shaft, a hollow flanged screw on which the first drum section is supported for rotary motion, an activating screw cam attached to said screw for activating the sectional cam, and a rack plunger cam attached to the second drum section, the screw cam being adapted to open the rack plunger before said screw cam raises or lowers the second section, and the screw cam closing the rack plunger after said screw cam raises or lowers the second section.

References Cited in the file of this patent

UNITED STATES PATENTS

| | | |
|---|---|---|
| 1,737,598 | Lombardi | Dec. 3, 1929 |
| 1,872,597 | Lawson et al. | Aug. 16, 1932 |
| 2,030,516 | Lawson et al. | Feb. 11, 1936 |
| 2,516,697 | Haddad | July 25, 1950 |